Patented May 18, 1937

2,080,654

UNITED STATES PATENT OFFICE 2,080,654

REMOVAL OF SULPHUR COMPOUNDS FROM HYDROCARBON OIL AND REGENERATION OF SPENT TREATING AGENT

Wallace A. Craig, Los Angeles, Calif., assignor to William C. McDuffie, receiver for Richfield Oil Company of California, Los Angeles, Calif., a corporation of Delaware No Drawing. Application June 29, 1935, Serial No. 29,101

2 Claims. (Cl. 23—184)

This invention pertains to the removal of sulphur compounds from hydrocarbon oils, particularly those contained in cracked gasoline stock, and which are readily removed by subjecting the oil to an alkali wash. More specifically, this invention deals with the separation of mercaptans and hydrogen sulphide from petroleum oil, the continuous revivification of the treating agent for reuse, and the recovery of the mercaptans as disulphides.

An object of this invention is to remove sulphur compounds from hydrocarbon oil, and to regenerate the alkali wash so that it may be used repeatedly, as will be illustrated in the following description.

Another object of this invention is to recover valuable sulphur compounds which are separated by the operation of this invention.

Other objects and advantages of this invention will present themselves in the following detailed disclosure of my invention.

Removal of mercaptans and hydrogen sulphide by washing petroleum oils with caustic soda solution, or other alkali solutions, is known in the art. Heretofore, the removal of these compounds in this manner has been commercially expensive and, with respect to the mercaptans, incomplete. The alkali which is consumed in removing hydrogen sulphide is lost insofar as its value within the treating system is concerned. Mercaptan removal follows the physical chemical laws of distribution and, in many instances, requires a large quantity of alkali solution to be beneficial. Operating in this manner and discarding the alkali solution after it has reached equilibrium with the mercaptan containing oil, insofar as mercaptan distribution is concerned, is not economical from a commercial point of view.

Various investigators have attempted to regenerate the alkali solution so that it may be used more than once, and this invention pertains to a novel method of effecting this regeneration. It is generally recognized in the art that mercaptans are converted to the corresponding disulphides by treating them with oxidizing agents. This characteristic is utilized in the sodium plumbite, or doctor treatment, of sour petroleum distillate. Dissimilarities, however, such as the difference in mercaptan concentration in a sour gasoline and a spent alkali solution, the nature of the solvent, the precautions that must be taken when sour gasoline is sweetened to prevent side reactions, etc., require that the gasoline be treated in a manner quite different from the treatment of spent alkali. The only limitations in the treatment of the spent alkali solution are that the impurities be removed or converted to inert products that will not cause deterioration of the oil to be processed, and that the residual alkali in the spent solution be not appreciably destroyed by conversion into other chemical compounds which would not be effective in subsequent mercaptan removal.

It is recognized in the art that a mercaptan bearing alkali can be regenerated or revivified by blowing with air or other oxidizing gas. However, in the present state of the art, there are a number of objectionable features which may render the revivification commercially unprofitable. Revivification by air blowing, either at atmospheric or elevated temperatures, requires a prolonged period of time to obtain a regenerated solution which is satisfactory for reuse. Other oxidizing gases, such as chlorine, may react with a portion of the residual alkali, forming salts, thereby reducing the concentration of the active alkali reagent in the solution.

Now, I have discovered that when the spent alkali reagent is regenerated by blowing with air or other oxidizing gases at superatmospheric pressure, the rate of conversion of the mercaptans or alkali mercaptides in the solution into disulphides is accelerated and, under the proper conditions of temperature and pressure, the mercaptans or alkali mercaptides, also the alkali sulphides, can be substantially completely converted to inert compounds. The compounds formed by oxidation of the alkali sulphides have no deleterious effect if left in the solution, and the disulphides will separate from the aqueous solution and can be removed by decantation.

The following example will illustrate the method of carrying out this new and novel process. It is to be understood, however, that I do not limit myself to the specific reagent mentioned in this illustration, since caustic potash or other alkali solutions may be used, nor to the conditions of temperature and pressure described herein. Other alkali reagents may be regenerated in a similar manner, and the choice of optimum temperatures and pressures will depend upon the nature of the reagent and impurities which are to be removed.

Treatment of sour gasoline or naphtha stock for the removal of mercaptans and hydrogen sulphide is accomplished by intimately mixing the stock with a quantity of caustic soda solution. This may be done by any of the well known mixing methods, but I prefer to utilize a countercurrent treating system, whereby the gasoline is progressively contacted with the more active caustic soda solution as the treatment progresses. In this manner the maximum removal of mercaptans and other alkali soluble compounds is effected.

I am choosing for my example a test made by countercurrent washing a sour cracked distillate with 25 per cent of its volume of caustic soda solution of 16° Bé., using three countercurrent stages for the treatment. The analysis of the cracked distillate for hydrogen sulphide content was determined by using a 10 per cent cadmium chloride solution, acidified with 1 per cent of hydrochloric acid reagent. The determination of mercaptans in the cracked distillate was made in accordance with the method described by P. Borgstrom and Emmett Reid, in the Industrial and Engineering Chemistry, analytical edition, volume 1, page 186 (1929).

The mercaptan content of the spent caustic soda solution was determined as follows: A measured quantity of the spent solution was placed in a separatory funnel, and to it was added a measured quantity of doctor sweet naphtha. Dilute acid was then added until the aqueous phase gave an acid reaction, thereby releasing the mercaptans and allowing them to dissolve in the naphtha. The naphtha was then treated with water, followed by the addition of acidified cadmium chloride solution to remove hydrogen sulphide, and then filtered. A portion of the naphtha was then analyzed for mercaptans in the usual manner, and the mercaptan content of the caustic soda solution calculated. Determinations are reported in terms of mols of mercaptan per liter of solvent.

Treatment of the cracked distillate in the manner described removed all hydrogen sulphide and reduced the mercaptan content in the distillate from 0.069 mol. per liter to 0.033 mol. per liter. The spent caustic contained approximately 30 grams per liter of sulphide, calculated as sodium sulphide. The spent caustic soda solution was placed in an open container and blown with air. The tabulation included herewith shows the conditions existing during the blowing operation for two different experiments, one in which the temperature was approximately atmospheric, and the other in which the temperature was maintained considerably above that of the atmosphere.

*Tabulation of results in air blowing spent NaOH solution at atmospheric pressure*

| Cold treat (approx. 75°–85° F.) | | | Hot treat | | | |
|---|---|---|---|---|---|---|
| Hours blown | Mercaptan and/or mercaptide content mols/liter | Total air used cu. ft./gal. of solution | Hours blown | Temp. °F. | Mercaptan and/or mercaptide content mols/liter | Total air used cu. ft./gal. of solution |
| 0.0 | 0.286 | | 0 | | 0.400 | |
| 1.0 | 0.246 | 0.333 | 2 | | 0.390 | 0.67 |
| 2.5 | 0.218 | 0.833 | 4 | 123 | 0.360 | 1.34 |
| 3.5 | 0.210 | 1.167 | 6 | 124 | 0.322 | 2.00 |
| 5.5 | 0.194 | 1.833 | 8 | 125 | 0.278 | 2.67 |
| 7.5 | 0.176 | 2.510 | 10 | 128 | 0.230 | 3.34 |
| 9.5 | 0.168 | 3.190 | 12 | 135 | 0.166 | 4.00 |
| 11.5 | 0.156 | 3.870 | 14 | 135 | 0.154 | 4.67 |
| 13.5 | 0.132 | 4.540 | 16 | 135 | 0.148 | 5.34 |
| 15.5 | 0.132 | 5.210 | 18 | 132 | 0.145 | 6.00 |
| 17.5 | 0.128 | 5.870 | 20 | 120 | 0.134 | 6.67 |
| 19.5 | 0.120 | 6.540 | 22 | 130 | 0.130 | 7.34 |
| 21.5 | 0.116 | 7.210 | 24 | 134 | 0.120 | 8.03 |
| 23.5 | 0.108 | 7.900 | 26 | 132 | 0.104 | 8.70 |
| 25.5 | 0.100 | 8.590 | 28 | 130 | 9.090 | 9.37 |
| 27.5 | 0.088 | 9.260 | 30 | 128 | 0.078 | 10.03 |
| 29.5 | 0.073 | 9.930 | 32 | 128 | 0.068 | 10.70 |
| 31.5 | 0.064 | 10.600 | 34 | 128 | 0.062 | 11.37 |
| 33.5 | 0.060 | 11.270 | 36 | 130 | 0.047 | 12.06 |
| 35.5 | 0.054 | 11.940 | 38 | 130 | 0.030 | 12.73 |
| 37.5 | 0.050 | 12.620 | 40 | 130 | 0.010 | 13.40 |
| | | | 42 | 130 | 0.004 | 14.06 |
| | | | 44 | 130 | 0.001 | 14.73 |

The above tabulation is a record of experiments carried on in accordance with methods known in the art. My next experiment was conducted according to the new and novel method described herein, and definitely shows the advantages to be obtained.

A portion of spent caustic soda solution was placed in a closed container, and the latter brought to a pressure of 125 pounds per square inch absolute with compressed air. The ratio of caustic soda solution to air at this pressure was approximately 1:5. The container was agitated for one hour and a sample then withdrawn. The mercaptan and/or mercaptide concentration had dropped from 0.129 mol. to per liter to 0.019 mol. per liter. The residual air within the container was released and a fresh charge of air was introduced. After agitating the container for another hour, the mercaptan and/or mercaptide concentration was reduced to 0. Further than that, the sodium sulphide was practically completely converted to other compounds. The latter phenomenon was not obtained in the tests conducted at atmospheric pressure.

The process may be operated at varying temperatures, which may range from 70° F. or lower to the boiling temperature of the solution at the pressure employed, these conditions being so chosen as to give the desired conversion rate for the material which is being treated.

It is apparent from the foregoing illustrations that, operating under superatmospheric pressure in accordance with my invention, regeneration of the alkali solution used to extract hydrogen sulphide and mercaptans from hydrocarbon oils can be effected more efficiently and rapidly than by known methods, that the alkali reagent is not converted into inactive compounds, and that useful by-products consisting of disulphides and thiosulphates can be recovered.

While the above example refers specifically to the use of air under high pressure, it is to be understood that the invention is not limited to its use alone, and that any gaseous mixture which contains oxygen which is available for oxidation can be employed, and that the rate of conversion of mercaptans to disulphides and hydrogen-sulphide to thiosulphates can be increased by operating at pressures above atmospheric.

While the process herein described is well adapted for carrying out the objects of the present invention, various forms and modifications may be made without departing from the spirit of the invention, and the invention includes all such modifications as appear within the scope of the appended claims.

I claim:

1. In the method of regenerating spent alkali solution containing alkali mercaptides and alkali sulphides, by treatment with an oxygen containing gas, to convert the mercaptides to disulphides and the sulphides into thiosulphates by oxidation, the improvement of increasing the percent converted and the conversion rate which comprises, contacting the spent alkali solution under superatmospheric pressure of 125 pounds absolute, with air, at a reaction temperature ranging from 70° F. to the boiling temperature of the spent alkali solution, at the pressure employed.

2. In the method of regenerating spent caustic soda solution containing sodium mercaptides and sodium sulphide, by treatment with air, to completely convert the mercaptides into disulphides and the sulphide into thiosulphate by oxidation, the improvement of increasing the percent converted and conversion rate which comprises, contacting the spent solution under superatmospheric pressure of 125 pounds absolute, with air, at a reaction temperature ranging from 70° F. to the boiling temperature of the spent alkali solution, at the pressure employed.

WALLACE A. CRAIG.